(12) United States Patent
Heldberg

(10) Patent No.: US 9,341,107 B2
(45) Date of Patent: May 17, 2016

(54) THERMOSTAT VALVE ARRANGEMENT WITH MAGNETIC LOCKING DEVICE AND A COOLING SYSTEM FOR COMBUSTION ENGINE DRIVEN VEHICLES

(75) Inventor: Carsten Heldberg, Kirchlinteln (DE)

(73) Assignee: ITW AUTOMOTIVE PRODUCTS GMBH, Iserlohn (DE)

( * ) Notice: Subject to any disclaimer, the term of this patent is extended or adjusted under 35 U.S.C. 154(b) by 1146 days.

(21) Appl. No.: 13/125,456

(22) PCT Filed: Oct. 21, 2009

(86) PCT No.: PCT/IB2009/054666
§ 371 (c)(1),
(2), (4) Date: Apr. 21, 2011

(87) PCT Pub. No.: WO2010/052601
PCT Pub. Date: May 14, 2010

(65) Prior Publication Data
US 2011/0204151 A1     Aug. 25, 2011

(30) Foreign Application Priority Data
Nov. 6, 2008 (DE) .......................... 10 2008 056 247

(51) Int. Cl.
F01P 7/16     (2006.01)
(52) U.S. Cl.
CPC ............. *F01P 7/167* (2013.01); *F01P 2025/04* (2013.01); *F01P 2070/10* (2013.01)
(58) Field of Classification Search
CPC .. F16K 31/0648; F16K 31/0658; F01P 7/167; F01P 2025/04; F01P 2070/10
USPC ........ 236/88, 93 R, 101 R, 101 C; 123/41.08, 123/41.09, 41.1, 41.02, 41.05; 251/129.01, 251/129.02
See application file for complete search history.

(56) References Cited

U.S. PATENT DOCUMENTS 2,029,357 A * 2/1936 Chryst .......................... 236/93 R
2,396,138 A * 3/1946 Vernet .............................. 60/527
(Continued)

FOREIGN PATENT DOCUMENTS

DE          19725222 A1     12/1998
DE       102004058869 A1     6/2006
(Continued)

OTHER PUBLICATIONS

Fukunaga et al translation.*
(Continued)

*Primary Examiner* — Travis Ruby
*Assistant Examiner* — Gordon Jones
(74) *Attorney, Agent, or Firm* — Hauptman Ham, LLP

(57) ABSTRACT

A thermostatic valve aggregate for a motor vehicle cooling system, having a valve housing containing a valve seat, further having an expansible drive element which is configured in the valve housing and is coupled to a valve element, and a spring biasing the valve element against the valve seat, one coolant hookup on each side of the valve seat, a bypass valve element prestressed by a bypass valve spring in the direction of a bypass valve seat in order to selectively link one bypass hookup to the valve housing to one of the other hookups, characterized
in that an electromagnet is mounted on the valve housing and comprises a core extending as far as the bypass valve seat, in that the bypass valve element is fitted with a magnetically effective armature element resting against or nearly reaching the core when the bypass valve rests against the bypass valve seat.

12 Claims, 3 Drawing Sheets

(56) References Cited

U.S. PATENT DOCUMENTS

| | | | | |
|---|---|---|---|---|
| 2,815,035 | A | * | 12/1957 | Eskin et al. .................... 137/65 |
| 3,792,813 | A | * | 2/1974 | Saur et al. .................... 236/100 |
| 4,407,448 | A | * | 10/1983 | Yamanaka et al. ............. 236/88 |
| 5,494,005 | A | * | 2/1996 | Saur ............................. 123/41.1 |
| 5,676,345 | A | * | 10/1997 | Zurke et al. ............. 251/129.15 |
| 7,055,539 | B2 | * | 6/2006 | Suzuki ............................. 137/1 |
| 2003/0136357 | A1 | * | 7/2003 | Kobayashi et al. ........ 123/41.08 |
| 2004/0007629 | A1 | * | 1/2004 | Ieda ........................... 236/101 R |
| 2008/0223316 | A1 | * | 9/2008 | Banta et al. ................. 123/41.1 |
| 2010/0251979 | A1 | * | 10/2010 | Pottie ......................... 123/41.02 |

FOREIGN PATENT DOCUMENTS

| | | | |
|---|---|---|---|
| EP | 0694423 | A2 | 1/1996 |
| JP | 58211080 | A * | 12/1983 |
| JP | 09195768 | A * | 7/1997 |

OTHER PUBLICATIONS

Kiyoshi translation.*
ISR for PCT/IB2009/054666 dated Jan. 15, 2010.

* cited by examiner

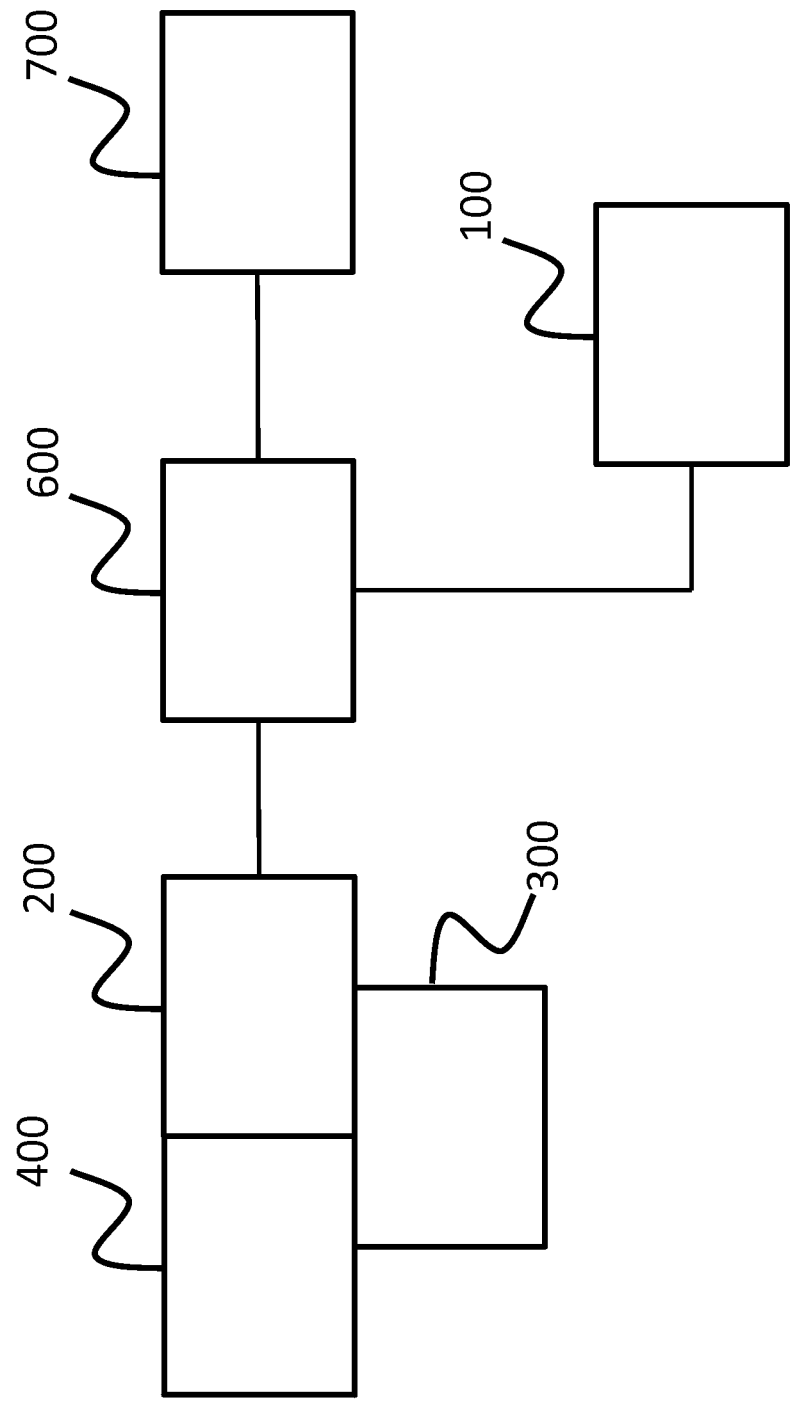

THERMOSTAT VALVE ARRANGEMENT WITH MAGNETIC LOCKING DEVICE AND A COOLING SYSTEM FOR COMBUSTION ENGINE DRIVEN VEHICLES

RELATED APPLICATIONS

The present application is national phase of PCT/IB2009/054566 filed Oct. 21, 2009, and claims priority from German Application Number 10 2008 056 247.5 filed Nov. 6, 2008.

Conventional thermostatic valve aggregates for the cooling system of internal-combustion engine powered vehicles comprise a thermostatic valve mounted in a valve housing and typically being driven by a so-called thermally expansible element. The thermally expansible element is made of an appropriate material increasing in bulk when heated, as a result of which a push-bar or the like is displaced a corresponding distance out of the thermally expansible element's housing. This displacement commensurately moves an element of the thermostatic valve—which otherwise is biased by a valve spring into a valve seat—commensurately out of this valve seat. It is also known to simultaneously design such thermostatic valves as bypass valves fitted with a bypass valve element that operationally communicates with said thermostatic valve element and is spring-biased against a bypass valve seat. The bypass valve element's bias direction is opposite that of the thermostatic valve element. At low temperatures the thermostatic valve remains in its closed position while the bypass valve element on account of a pressure differential may move into its open position to allow a cooling medium to flow in a bypass.

To rapidly heat the internal combustion engine to its operating temperature and in this manner to reduce fuel consumption and gas exhausts, the water circulation through the engine ought to be suppressed during the cold start phase. A cold-start circuit of this kind is known. However it incurs the drawback of not immediately using the coolant temperature to drive a thermally expansible element because, during said cold-start phase, the coolant does not circulate through the engine and therefore the instantaneous temperature information, for instance the cylinder liner temperature, cannot be transmitted to the thermally expansible element to terminate the cold start phase at the appropriate time.

The objective of the present invention is to create a thermostatic valve aggregate for an internal combustion engine's cooling system terminating in a timely manner the coolant flow suppression following the cold start.

An electromagnet is configured in the present invention's thermostat valve housing and comprises a core extending closely to the bypass valve seat. The bypass valve element is fitted with a magnetically effective armature element resting against the core or being close to it when the bypass valve rests against the bypass valve seat.

Applying electric power to the electromagnet allows keeping the bypass valve element in its closed position even when it is exposed to a pressure differential of the internal combustion engine's cooling system. If on the other hand the electromagnet no longer is being powered, the bypass valve element due to said pressure differential is able to open and allow the coolant to flow through the motor and the bypass.

It is known that internal combustion engines comprise a control. This control is used in the present invention to allow connecting the electromagnet to an energy source within the motor vehicle respectively selectively interrupting such a connection. Interrupting respectively terminating the electric power to the electromagnet may be implemented as a function of time following after engine start. Such interruption of electric power also may be implemented automatically by being temperature-dependent, namely using a temperature sensor to ascertain engine temperature.

By suitably designing the bypass valve element and the electromagnet's retention force, the valve may be open even when a given water pressure has been exceeded. Accordingly the valve of the present invention also may operate as a pressure relief valve.

In one embodiment mode of the present invention, a coil is affixed to the valve housing outside and its core segments are inserted in sealing manner through apertures into this valve housing. The core preferably is U-shaped and its legs run as far as the valve seat.

Conceivably however the bypass valve element may be made of a magnetically effective material. Preferably however the bypass valve element shall be made of plastic, one armature portion—illustratively made of an appropriate armature metal—being mounted to the bypass valve element. Such a design illustratively may be implemented by integrating the armature material into the material of the bypass valve element.

In another embodiment mode of the present invention, the bypass valve element is guided axially along at the valve element and is prestressed—by the bypass valve spring resting on the valve element opposite the thermostatic valve element—toward the bypass valve seat. Accordingly the bypass valve element is closed/opened in the opposite direction to that of the thermostatic valve. During ordinary thermostatic control, the thermostat valve of the present invention behaves like a conventional thermostatic bypass valve.

In another embodiment mode of the present invention, a first bypass valve spring rests at one end on the valve element and by its other end on an annulus or support washer guided within a cylindrically circular gap of the bypass valve element. Said gap moreover receives a second bypass valve spring which engages the opposite side of said annulus or washer, the spring constant of the first bypass valve spring being larger than that of the second one. When the bypass valve element is opened, substantially only the second bypass valve shall be deformed. The partial or complete closure of the bypass valve element is implemented by the first spring's pressure generated by the thermostatic valve element and applied to the second bypass valve spring. The first valve bypass spring accordingly mainly acts to transmit force and to a lesser degree to generate a bias on the valve.

The present invention is elucidated below in relation to an illustrative embodiment mode.

FIG. 5 is a functional diagram of an exemplary embodiment.

Figure 1:
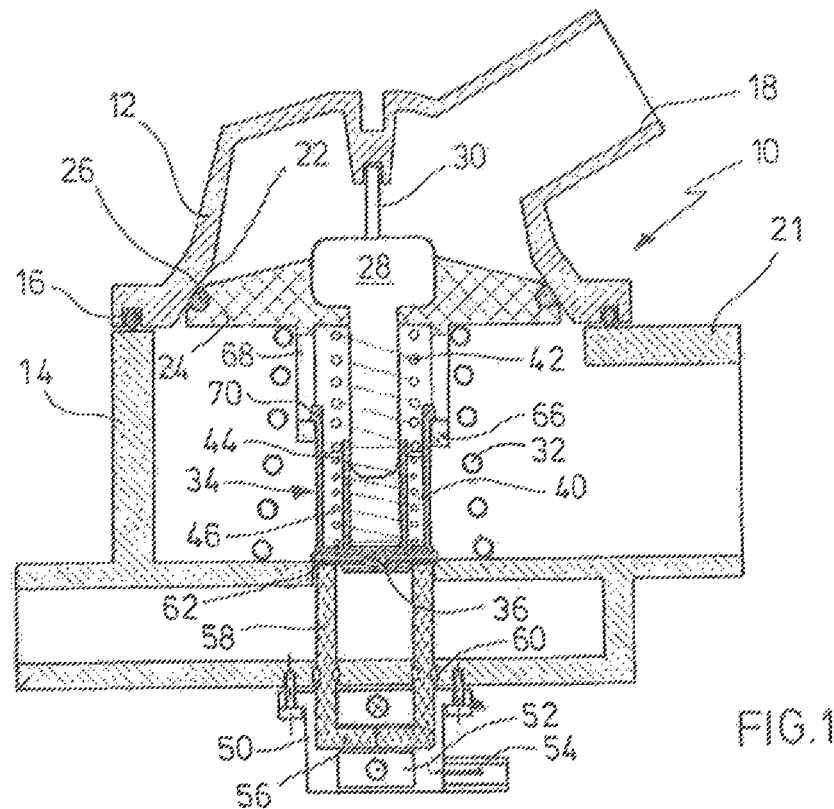
FIG. 1 is a vertical cross-section of a thermostatic valve aggregate of the present invention.
Figure 2:
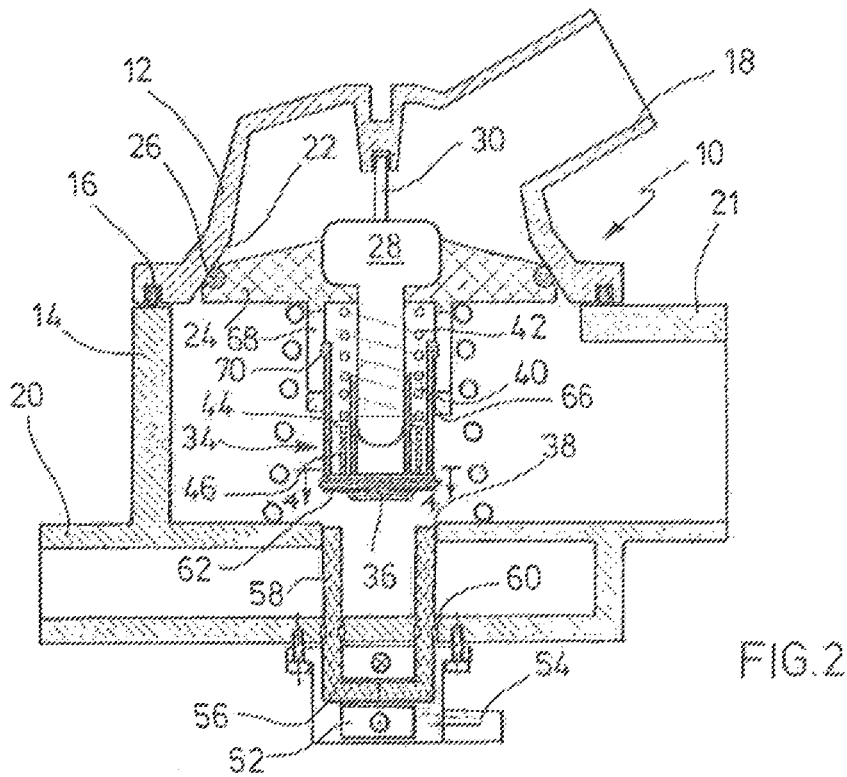
FIG. 2 shows the valve aggregate of FIG. 1 but in this instance with an opened bypass valve.
Figure 3:
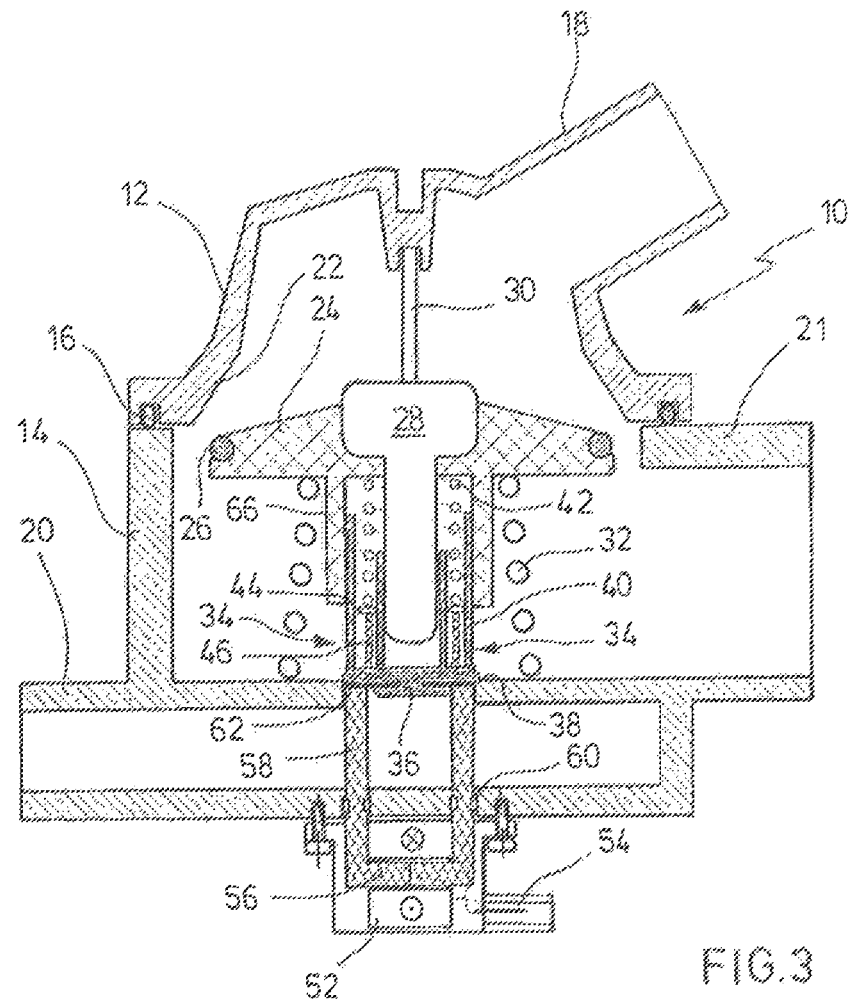
FIG. 3 shows the thermostatic valve aggregate of FIG. 1 after said valve has been opened.

FIGS. 1 through 3 show a thermostatic valve aggregate denoted overall by the reference 10. It comprises a valve housing fitted with an upper housing segment 12 and a lower housing segment 14. The housing segments 12, 14 are made of a suitable plastic and connected to each other in appropriate manner, preferably being mutually detachable. A seal 16 is situated between said two segments. The upper housing segment 12 comprises a first coolant hookup 18. The lower housing segment comprises a second coolant hookup 20. The lower housing segment 14 moreover includes a third coolant hookup 21 for a bypass conduit.

The upper housing segment 12 is fitted with an inner valve seat 22 cooperating with a discoid thermostatic valve element 24 peripherally fitted with a sealing ring 26. A thermally expansible element 28 is inserted in the valve disk 24 and has an outwardly pointing push-pin 30 that rests against the cover of the upper housing segment 12. A conically flaring helical valve spring 32 biases the valve disk 24 toward the valve seat 22.

A bypass valve element 34 comprises a valve disk 36 cooperating with a bypass valve seat 38. As shown in FIGS. 1 and 3, no flow takes place between the hookups 20 and 21 in the closed position of the valve disk 36. Consequently no coolant can flow in the bypass of an omitted internal combustion engine's cooling system (not detailed further).

The bypass valve element 34 is fitted with a cylindrically circular guide gap 40 on its side opposite the valve seat 38. Said guide gap partly receives a first bypass valve spring 42 that rests by its other end on the valve disk 24. Within the cylindrically circular guide gap, the first spring 42 rests on a washer 44. A second bypass valve spring 46 is configured at the opposite side of the washer 44. The spring constant of said second spring is less than that of the first bypass spring 42. The springs 42, 46 respectively assure that the bypass valve element and the valve disk 36 shall rest against the valve seat 38 when there is significant pressure differential between the hookups 20, 21. When this pressure differential reaches a given magnitude, the bypass valve element 34 opens, as shown in FIG. 2, to allow coolant to flow through the bypass and the internal combustion engine's motor block.

Figure 4:
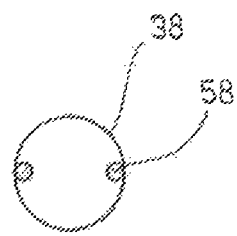
FIG. 4 is a cross-section along the line 4-4 in FIG. 2.

A sub-housing 50 is screwed onto the underside of the lower housing segment 14 and contains an electromagnetic coil 52. The magnetically responsive coil 52 is connected by a merely referenced connection 54 and an omitted switch to a source of energy (also omitted) in the motor vehicle containing the omitted internal combustion engine. The magnetically responsive coil 52 receives a crossbar 56 of a U-shaped core 58 of which the legs run in sealing manner through apertures 60 in the housing segment 14 as far as near the valve seat 38 as shown clearly in FIG. 2. An iron sheetmetal element 62 is imbedded into the valve disk 36, the leg ends of the core 58 resting against said sheetmetal or being situated near it. The core's cross-section is shown in FIG. 4. The core essentially is made of a magnetically effective wire bent into said U-shape. Obviously the core also may be a ferrite.

In the closed position shown in FIGS. 1 and 3 of the bypass valve element 34, the bypass element shall be kept in said closed position as long as electric power is applied to the electromagnet 52. The pressure differential applied to the bypass valve element 34 is insufficient to open the bypass valve element 34. Accordingly such applied electric power precludes coolant from flowing through a bypass to the internal combustion engine for the configuration of FIG. 1. The thermostatic valve also being closed, the temperature of the internal combustion engine may be rise in the shorted possible time. When that state has been reached, the electric power to the magnet 52 is shut off and, due to the pressure differential, henceforth the bypass valve element 34 also may open as indicated in FIG. 2 to allow the coolant to flow along the bypass. Moreover, the bypass valve element 34 might be designed as regards its cross-section and springs in a manner that the bypass valve shall open even when electric power is applied to the coil 52 when the pressure differential should be excessive. In that event the bypass valve acts as a relief valve.

During typical operation, the bypass valve element 34 operates conventionally, that is it will close gradually when the thermostatic valve together with the valve disk 24 moves into the open position. This phase is indicated in FIG. 3 when the thermostatic valve is fully open; the bypass valve is closed.

As indicated in FIGS. 1 through 3, the valve disk 24 is fitted with an axial tubular stub 66 guiding at its inside an outer wall of the guide 40 of the bypass valve element 34. As shown by FIGS. 1 and 2, the axial, tubular stub 66 may be fitted with mutually opposite slots 68 that run in the axial direction and that guide in them beaks 70 of the bypass valve element 34. These beaks 70 limit the displacement of the bypass valve element 34 away from the valve disk 24. They allow pre-mounting the valve disk 24 and the bypass valve element 34 before this unit is inserted into the valve housing.

Referring now to FIG. 5, there is depicted an internal combustion engine control 100 according to any of the internal combustion engine controls detailed above, wherein an electromagnet 200 is mounted on a valve housing 300 and cooperates with a magnetically effective bypass valve element 400 when it is in its closed position. FIG. 5 also depicts a switch 600 connecting the electromagnet 200 to a source of energy 700 that is also is connected to the control 100 and is driven by it.

The invention claimed is:

1. A thermostatic valve aggregate for a motor vehicle cooling system, comprising a valve housing containing a valve seat, a thermally expansible drive element in the valve housing and coupled to a valve element, a spring biasing the valve element against the valve seat, a first coolant hookup and a second coolant hookup with the valve seat therebetween, a bypass valve element prestressed by a bypass valve spring in the direction of a bypass valve seat in order to selectively link one bypass hookup to the valve housing of the first coolant hookup and the second coolant hookup to the other bypass hookup of the first coolant hookup and the second coolant hookup, wherein an electromagnet is mounted on the valve housing and comprises a core having a first end, wherein the first end is located at the bypass valve seat, wherein the bypass valve element is fitted with a magnetically effective armature element, and wherein the thermostatic valve aggregate is configured such that the magnetically effective armature element rests against said core when the bypass valve rests against the bypass valve seat or a portion of the bypass valve element falls within said core.

2. Thermostatic valve aggregate as claimed in claim 1, characterized in that a coil is mounted on the valve housing outer side and in that core portions are inserted in a sealing manner through valve housing apertures into the valve housing.

3. Thermostatic valve aggregate as claimed in claim 1, characterized in that the core is U-shaped said core has legs extend approximately as far as to a proximity of the bypass valve seat.

4. Thermostatic valve aggregate as claimed in claim 1, characterized in that the bypass valve element is made of plastic and incorporates the magnetically effective armature element.

5. Thermostatic valve aggregate as claimed in claim 4, characterized in that the magnetically effective armature element is imbedded into the material of the bypass valve.

6. Thermostatic valve aggregate as claimed in claim 1, characterized in that the bypass valve element is guided axially along the valve element and is prestressed by the said bypass valve spring resting against the thermostatic valve element in a direction from said valve element toward the bypass valve seat.

7. Thermostatic valve aggregate as claimed in claim 1, characterized in that the bypass valve element is made of plastic and incorporates at least one sheet-metal armature element.

8. A thermostatic valve aggregate for a motor vehicle cooling system, comprising a valve housing containing a valve seat, further a thermally expansible drive element in the valve housing and coupled to a valve element, a spring biasing the valve element against the valve seat, a first coolant hookup and a second coolant hookup with the valve seat therebetween, a bypass valve element prestressed in the direction of a bypass valve seat in order to selectively link one bypass hookup to the valve housing to one other bypass hookup, wherein an electromagnet is mounted on the valve housing and comprises a core having a first end, wherein the first end is located at the bypass valve seat, wherein the bypass valve element is fitted with a magnetically effective armature element, and wherein the thermostatic valve aggregate is configured such that the magnetically effective armature element rests against said core when the bypass valve rests against the bypass valve seat or a portion of the bypass valve element falls within said core, wherein the bypass valve element is guided axially along the valve element and is prestressed by the spring resting against the thermostatic valve element in a direction from said valve element toward the bypass valve seat, and wherein a bypass valve spring rests at one end against the thermostatic valve and by its other end against a support washer guided within a cylindrically circular gap of the bypass valve element and in that a second bypass valve spring acts on the support washer from the opposite side, the spring constant of the first bypass valve spring being larger than that of the second bypass valve spring.

9. Thermostatic valve aggregate as claimed in claim 1, wherein the thermostatic valve aggregate is configured such that the bypass valve element is fitted with the magnetically effective armature element such that the bypass valve element rests against said core when the bypass valve rests against the bypass valve seat.

10. Thermostatic valve aggregate as claimed in claim 8, wherein the thermostatic valve aggregate is configured such that the bypass valve element is fitted with the magnetically effective armature element such that the bypass valve element rests against said core when the bypass valve rests against the bypass valve seat.

11. Thermostatic valve aggregate as claimed in claim 1, wherein the core extends along a first axis, wherein the valve element moves in respective directions parallel to the first axis to respectively open and close the valve, and wherein the core extends along the first axis to the valve seat.

12. Thermostatic valve aggregate as claimed in claim 8, wherein the core extends along a first axis, wherein the valve element moves in respective directions parallel to the first axis to open and close the valve, and wherein the core extends along the first axis to the valve seat.

* * * * *